United States Patent
Hees et al.

(10) Patent No.: US 6,914,118 B2
(45) Date of Patent: Jul. 5, 2005

(54) POLYURETHANE METHOD FOR THE PRODUCTION THEREOF AND BINDING AGENT PRODUCED THEREFROM

(75) Inventors: Ulrike Hees, Mannheim (DE); Hans-Guenter Bohrman, Ludwigshafen (DE); Benedikt Raether, Limburgerhof (DE); Ria Kress, Ludwigshafen (DE); Albert Kohl, Laumersheim (DE)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/398,930

(22) PCT Filed: Oct. 9, 2001

(86) PCT No.: PCT/EP01/11657

§ 371 (c)(1),
(2), (4) Date: Aug. 21, 2003

(87) PCT Pub. No.: WO02/31012

PCT Pub. Date: Apr. 18, 2002

(65) Prior Publication Data

US 2004/0127675 A1 Jul. 1, 2004

(30) Foreign Application Priority Data

Oct. 13, 2000 (DE) .......................... 100 50 710

(51) Int. Cl.$^7$ ................................................ C08G 18/32
(52) U.S. Cl. .......................... 528/71; 528/78; 428/900; 428/425.9; 524/176; 524/785
(58) Field of Search .............................. 428/425.9, 900; 528/71, 78; 524/176, 785

(56) References Cited

U.S. PATENT DOCUMENTS

| | | | |
|---|---|---|---|
| 4,131,731 A | 12/1978 | Lai et al. | 528/370 |
| 4,152,485 A | 5/1979 | Mizumura et al. | 428/425 |
| 4,496,678 A | 1/1985 | Wenzel et al. | 524/157 |
| 5,082,737 A | 1/1992 | Bobrich et al. | 428/425 |
| 5,652,320 A * | 7/1997 | Takemoto et al. | 528/71 |
| 5,747,630 A | 5/1998 | Amirsakis | 528/71 |
| 2001/0016641 A1 | 8/2001 | Hees et al. | 528/44 |

\* cited by examiner

*Primary Examiner*—Rachel Gorr
(74) *Attorney, Agent, or Firm*—Eric D. Levinson

(57) ABSTRACT

A polyurethane having at least one anionic anchor group L, the anchor group L being covalently bonded to a polyether segment having at least one nitrogen atom in the polyurethane.

14 Claims, No Drawings

POLYURETHANE METHOD FOR THE PRODUCTION THEREOF AND BINDING AGENT PRODUCED THEREFROM

The present invention relates to a polyurethane containing anchor groups, a process for its preparation, its use and binders and moldings prepared therefrom. A novel binder contains at least one novel polyurethane which has at least one anionic anchor group L, the anchor group L being covalently bonded to a polyether segment having at least one nitrogen atom in the polyurethane. In particular, the present invention relates to the use of binders containing such polyurethanes or of moldings prepared from such binders for the production of magnetic recording media.

Various groups of substances are known to be suitable as polymers for the production of magnetic recording media. The polyurethanes, which substantially improve in particular the resilience of the magnetic recording media or of coatings of such magnetic recording media, have proven particularly advantageous to date. Frequently, however, the low hardness and abrasion resistance of the polyurethanes have proven disadvantageous in the case of said polyurethanes.

U.S. Pat. No. 4,496,678 relates to viscosity-stabilized dispersions in which a sulfo-containing polyetherdiol acts as a stabilizing component in a polyurethane. Sulfo- and amino-carrying polyether segments are not mentioned here.

U.S. Pat. No. 5,747,630 relates to a polyurethane binder for a magnetic recording medium. The polyurethane binders described have, for example, polyether segments which have a cationic amino group with a sulfonic acid opposite ion. Amino-containing polyether segments which have a covalently bonded acid group are not mentioned in the document.

DE-C 28 33 845 relates to a magnetic recording material comprising a substrate or base material and a magnetizable layer of fine magnetic particles which are dispersed in a binder comprising polyester or polyurethane, said magnetizable layer being formed on said substrate or base material. A suitable polyurethane contains, for example, from 10 to 1000 equivalents of metal sulfonate groups per $10^6$ g of polymer. Polyurethanes having polyether segments which have both amino groups and acid groups are not described in the document.

Polyurethanes having anchor groups are described in DE-A 199 45 400.0, which relates to a thermoplastic block copolymer having at least one soft segment (A) and at least one hard segment (B), the hard segment (B) having at least one anionic and/or at least one cationic anchor group L.

Moreover, DE-A 100 05 647.4 discloses a binder composition, at least comprising a polyurethane having a structural unit according to the formula I defined therein

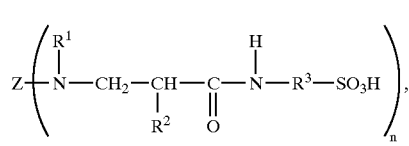

(I)

where n is from 1 to 10, the radicals $R^1$, in each case independently of one another, are a polyurethane having a molecular weight of at least about 1000, $R^4$—Q—, $R^4$—Q—(X—O—)$_m$X—Q— or $R^4$—Q—Y—Q—, Q being O, NH, $NR^2$ or S, $R^4$ being a linear or branched, saturated or unsaturated alkyl radical of 2 to 44 carbon atoms, X being an unsubstituted or aromatically substituted alkyl radical of 2 to 14 carbon atoms, Y being a polymer obtainable by polymerization, polyaddition or polycondensation and having a molecular weight $M_w$ of from 150 to 5000 and m being from 1 to 300, the radicals $R^2$, independently of one another, are each H or a linear or branched, saturated or unsaturated aliphatic hydrocarbon radical of 1 to about 20 carbon atoms, a saturated or unsaturated, unsubstituted or substituted cycloaliphatic hydrocarbon radical of 4 to about 20 carbon atoms, an unsubstituted or substituted araliphatic hydrocarbon radical of 6 to about 20 carbon atoms or an unsubstituted or substituted aromatic hydrocarbon radical of 6 to 18 carbon atoms, the radicals $R^3$ are a linear or branched, saturated or unsaturated alkyl radical of 2 carbon atoms or a saturated or unsaturated cycloalkyl radical of 4 to 44 carbon atoms, Z is a linear or branched, saturated or unsaturated, unsubstituted or substituted alkyl radical of 8 to 44 carbon atoms, an unsubstituted or substituted cycloalkyl radical of 4 to 44 carbon atoms, an unsubstituted or substituted araliphatic hydrocarbon radical of 6 to 40 carbon atoms or a polymer obtainable by polymerization, polyaddition or polycondensation and having a molecular weight $M_w$ of from 150 to 5000, Z being linked via suitable functional groups to the molecule as a whole, or a partial or full salt thereof, and at least one magnetic or magnetizable pigment.

DE-A 100 05 649.0 relates to a binder composition comprising a polyurethane having a structural unit according to the formula I

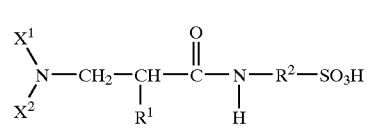

(I)

in which $R^1$ is H or a linear or branched, saturated or unsaturated aliphatic hydrocarbon radical of 1 to 20 carbon atoms, a saturated or unsaturated, unsubstituted or substituted cycloaliphatic hydrocarbon radical of 4 to 20 carbon atoms or an unsubstituted or substituted araliphatic hydrocarbon radical of 6 to 40 carbon atoms, $R^2$ is a linear or branched, saturated or unsaturated aliphatic hydrocarbon radical of 1 to 20 carbon atoms or a cycloaliphatic hydrocarbon radical of 4 to 20 carbon atoms or an unsubstituted or substituted aromatic hydrocarbon radical of 6 to 18 carbon atoms, $X^1$ and $X^2$, in each case independently of one another, are an unsubstituted or substituted radical comprising at least two carbon atoms, at least one of the radicals $X^1$ and $X^2$ being incorporated into the polyurethane by reaction of an OH, $NH_2$, $NHR^3$ or SH group, where $R^3$ is a linear or branched, saturated or unsaturated, unsubstituted or aromatically substituted alkyl radical of 1 to 44 carbon atoms, or a salt thereof, and at least one magnetic or magnetizable pigment.

In view of the prior art cited above, it is an object of the present invention to provide a novel polymer which is suitable for the production of magnetic recording media.

The present invention relates to a polyurethane having at least one anionic anchor group L, the anchor group L being covalently bonded to a polyether segment having at least one nitrogen atoms in the polyurethane.

In the context of the present invention, a "polyether segment having at least one nitrogen atom" is understood as meaning a segment which has at least two ether groups and at least one nitrogen atom. The at least one nitrogen atom may be arranged, for example, between two or more ether groups. However, it is also possible for the at least one nitrogen atom to be arranged at the end of the polyether segment. In the context of the present invention, such a nitrogen atom can be bonded, for example, to two or more carbon atoms. Corresponding carbon atoms may belong to an alkyl group or to functional groups, such as carboxyl groups or urea groups. Accordingly, the nitrogen atom is an amino N atom, an amido N atom or a urea N atom.

In the context of the present invention, a binder is understood as meaning a composition which contains at least one thermoplastic polyurethane defined herein. Preferably, the novel binder contains a mixture of two or more such polyurethanes or a mixture of at least one polyurethane with further polymers, the polymers or polyurethanes, after chemical or physical drying is complete, having a substantial role in producing stable dispersions and in providing sufficient mechanical stability of a magnetic recording medium produced from the binder.

In the context of the present invention, a thermoplastic block copolyurethane is understood as meaning a polyurethane which has a block structure A-B-A, these individual blocks being present with microphase separation. The thermoplastic block copolyurethane has a softening point or a softening range at a certain temperature or within a certain range. Above the softening point or softening range, the polyurethane is plastically deformable, said polyurethane retaining the shape produced in the plastic state on returning to temperatures of above this softening point or softening range and behaving substantially in the same way as a thermosetting plastic.

In the context of the present invention, a hard segment is understood as meaning a segment of a thermoplastic block copolyurethane molecule, the hard segment having a glass transition temperature above at least about 20 to 40° C., preferably at least about 50° C.

In the context of the present invention, a soft segment is understood as meaning a segment of a polyurethane molecule which is covalently bonded to a hard segment and has a glass transition temperature of less than about 20° C.

In the context of the present invention, an anchor group is understood as meaning an anionic group which is capable of interacting with ionic or at least polar compounds. In particular, anchor groups are understood as meaning those functional groups which are capable of interacting with the surface of inorganic filler materials, in particular with the surface of inorganic magnetic or magnetizable pigments.

The novel polyurethanes have at least one anionic anchor group L, the anchor group L being covalently bonded to a polyether segment having at least one amino group in the polyurethane.

A novel polyurethane may have a random structure, i.e. it need not be a polyurethane having a block structure. In the context of the present invention, however, it is also intended that a novel polyurethane will have segments of different hardness, in particular at least one soft segment and at least one hard segment.

In a preferred embodiment of the present invention, a novel polyurethane has thermoplastic properties. In a further preferred embodiment of the present invention, the novel polyurethane is a block copolyurethane.

The novel polyurethane may have anchor groups L both in a soft segment and in a hard segment. According to the invention, however, the number of anchor groups which are present in a hard segment of the thermoplastic polyurethane is greater than the number of anchor groups which are present in a soft segment (A) or a plurality of soft segments (A). In a preferred embodiment of the invention, the number of anchor groups which are present in the total number of hard segments (B) present in the polyurethane is at least five times, preferably at least 10 times, the total number of anchor groups in the soft segments (A). In a further preferred embodiment of the invention, the novel thermoplastic polyurethane has substantially no anchor groups in the soft segment (A) or the soft segments (A).

In a preferred embodiment of the invention, the novel polyurethane contains, as anchor group L, a carboxyl group, a sulfo group, a phosphonic acid group, a phosphoric acid group or a suitable salt of such a group.

In a further preferred embodiment of the invention, at least one anchor group L is covalently bonded to at least one polyether segment having at least one nitrogen atom in the polyurethane. In a further embodiment, the anchor group L is covalently bonded, directly or via an appropriate spacer, to at least one nitrogen atom in the polyether segment.

Suitable compounds for synthesizing such a polyether segment are, for example, polyether compounds which have terminal amino groups. Such polyether compounds can be functionalized, for example, by the corresponding amino groups with, for example, acrylamidopropanesulfonic acid (AMPS) by a Michael addition reaction in such a way that the terminal amino groups are each covalently bonded via a spacer on the amino N atom to the sulfo group as anchor group L. Such amino polyethers provided with at least one anchor group L can then be converted into polyureas or (in the presence of polyols) polyureapolyurethanes, for example by reaction with corresponding polyisocyanates. In the context of the present invention, polyureapolyurethanes are also referred to as polyurethanes for the sake of simplicity.

Compounds particularly suitable for synthesizing the polyether segments containing at least one nitrogen atom are, for example, compounds of the formula II

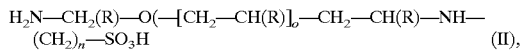

in which R is H or a linear or branched alkyl radical of 1 to 4 carbon atoms, in particular $CH_3$, n is from 1 to about 100, m is from 2 to 10 and o is 1 or 2, or the alkali metal salts thereof. Such products are sold, for example, by Raschig under the name Poly EPS 520Na.

If, in a novel polyurethane, a soft segment has a polyether segment having at least one nitrogen atom and at least one anchor group L, the molecular weight ($M_w$) of the polyether segment is at least about 700, but preferably more, for example at least about 800, 900 or about 1000 g/mol. The upper limit of the molecular weight is about 100000, but preferably less, in particular from 5000 to 25000.

If, in a novel polyurethane, a hard segment has a polyether segment having at least one nitrogen atom and at least one anchor group L, the molecular weight ($M_w$) of the polyether segment is at least about 60, but preferably more, for example at least about 100, 200 or 300 g/mol. The upper limit of the molecular weight is from about 500 to 1000, in particular about 600. The molecular weight should preferably be low, since otherwise a soft segment is present. However, molecular weights which are too low result in the polyether segment defined above no longer being soluble in conventional solvents, e.g. THF or dioxane.

In a preferred embodiment, the present invention relates to a thermoplastic polyurethane of the formula I

or a polyurethane of the formula

or a polyurethane of the formula II

where A, B and L have the abovementioned meanings, Z is a radical of a compound X-Z-X which is at least difunctional with respect to Y with formation of a covalent bond, Y is a functional group which is reactive with respect to the functional groups X of the compound Z with formation of a covalent bond, X is at least one functional group which is reactive with respect to the functional groups Y with formation of a covalent bond, n is from 1 to 10, m is from 1 to 10 and r is from 0 to 10, the number of anchor groups L in the total block copolyurethane being from 1 to n·m (formulae I and Ia) or from 1 from n·r+m (formula II).

In principle, suitable soft segments (A) are, for example, polyesters, polyethers, polyacetals, polycarbonates, polyesterethers and the like, e.g. polyesterpolyurethanes.

If the novel polyurethane has soft segments and hard segments, the polyether segment containing at least one nitrogen atom may be arranged in the soft segment or in the hard segment or in both segments.

Said compounds suitable for use as soft segments (A) have at least one functional group Y. In a preferred embodiment of the invention, the compounds suitable as soft segments (A) have at least two functional groups Y. In a further preferred embodiment of the invention, the functional groups Y are present as terminal groups in the compounds suitable for use as soft segment (A).

In principle, Y is a functional group which is capable of reacting with an NCO group with formation of a covalent bond. In a preferred embodiment of the invention, Y is OH, $NH_2$, NHR, SH or COOH, where R is a linear or branched, saturated or unsaturated alkyl radical of 1 to 24 carbon atoms or an aryl radical of 6 to 24 carbon atoms.

In a further preferred embodiment of the invention, Y is an OH, $NH_2$ or NHR group, in particular an OH group. In the further course of the text, compounds suitable for the preparation of soft segments (A) will be described. For the sake of clarity, the compounds, unless stated otherwise, are OH-carrying compounds. In the context of the present invention, however, it is also possible to use corresponding compounds which, instead of the OH group mentioned in the further description, carry another functional group reactive toward NCO groups, for example one of the other functional groups mentioned for Y, if a corresponding compound exists or can be prepared.

Polyesters suitable for the formation of soft segments are, for example, predominantly linear polymers having terminal OH groups, preferably those having two or three, in particular two, terminal OH groups. The polyesterpolyols can be prepared in a simple manner by esterification of linear or branched, saturated or unsaturated aliphatic or correspondingly suitable aromatic dicarboxylic acids of 4 to about 15, preferably 4 to about 10, carbon atoms with glycols, preferably glycols of about 2 to about 25 carbon atoms, or by polymerization of lactones of about 3 to about 20 carbon atoms. Dicarboxylic acids which may be used are, for example, glutaric acid, pimelic acid, suberic acid, sebacic acid, dodecanedioic acid and preferably adipic acid or succinic acid, or mixtures of two or more of said dicarboxylic acids. Suitable aromatic dicarboxylic acids are terephthalic acid, isophthalic acid, phthalic acid or mixtures of two or more of these dicarboxylic acids. Furthermore, tricarboxylic acids, e.g. trimellitic acid, are suitable. Mixtures of one or more of said aromatic di- or tricarboxylic acids with aliphatic or further aromatic dicarboxylic acids, for example with diphenic acid, pentadienoic acid, succinic acid or adipic acid, are also suitable.

Instead of the dicarboxylic acids, it may be advantageous to use corresponding acid derivatives, such as carboxylic anhydrides or acyl chlorides, if these are available, for the preparation of the polyesterpolyols.

The polyesterpolyols suitable for use as a soft segment in the context of the present invention can be prepared by reacting dicarboxylic acids with corresponding glycols. Glycols which in principle are suitable for the preparation of the polyesterpolyols are linear or branched, saturated or unsaturated, aliphatic or aromatic glycols. These are, for example, diethylene glycol, 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, 1,9-nonanediol, 1,10-decanediol and the corresponding higher homologs, as can be formed by stepwise extension of the carbon chain of said compounds, and, for example, 2.2,4-trimethyl-1,5-pentanediol, 2,2-dimethyl-1,3-propanediol, 1,4-dimethylolcyclohexane. 1,4-diethanolcyclohexane, 2-methyl-2-butyl-1,3-propanediol, 2,2-dimethyl-1,4-butanediol, 1,4-dimethylolcyclohexane, neopentylglycol hydroxypivalate, triethylene glycol, methyldiethanolamine or aromatic-aliphatic or aromatic-cycloaliphatic diols of 8 to about 30 carbon atoms, it being possible to use heterocyclic ring systems or preferably isocyclic ring systems, such as naphthalene derivatives or in particular benzene derivatives, such as bisphenol A, as aromatic structures, symmetrically diethoxylated bisphenol A, symmetrically dipropoxylated bisphenol A, more highly ethoxylated or propoxylated bisphenol A derivatives or bisphenol F derivatives, the hydrogenation products of said bisphenol A and bisphenol F derivatives or the products of the corresponding reaction of a compound or a mixture of two or more of said compounds with an alkylene oxide of two to about 8 carbon atoms or a mixture of two or more such alkylene oxides.

In a preferred embodiment of the invention, 1,2-ethanediol, 1,3-propanediol, 2-methyl-1,3-propanediol, 1,4-butanediol, 1,6-hexanediol, 2,2-dimethyl-1,3-propanediol, 1,4-dimethylolcyclohexane, 1,4-diethanolcyclohexane and ethoxylated or propoxylated products of 2,2-bis(4-hydroxyphenylene)propane (bisphenol A) are used. Depending on the desired properties of thermoplastic polyurethanes provided with the corresponding soft segments, said polyesterpolyols can be used alone or as a mixture of two or more of said polyesterpolyols in different ratios for the preparation of the thermoplastic polyurethanes. Suitable lactones for the preparation of the polyesterpolyols are, for example, α,α-dimethyl-γ-propiolactone, β-butyrolactone and ε-caprolactone.

The polyetherpolyols are also suitable for use as soft segments (A) in the preparation of the abovementioned thermoplastic polyurethanes. Polyetherpolyols are understood as meaning substantially linear substances having terminal OH groups in the context of the above statements and having ether bonds. Suitable polyetherpolyols can be prepared, for example, by polymerization of cyclic ethers, such as tetrahydrofuran, or by reaction of one or more alkylene oxides having 2 to 4 carbon atoms in the alkylene radical with an initiator molecule which has two active hydrogen atoms. Suitable alkylene oxides are, for example, ethylene oxide, 1,2-propylene oxide, epichlorohydrin, 1,2-butylene oxide or 2,3-butylene oxide or mixtures of two or more thereof.

The alkylene oxides can be used individually, alternately in succession or as mixtures of two or more of said alkylene oxides. Examples of suitable initiator molecules are water, glycols, such as ethylene glycol, propylene glycol, 1,4-butanediol, 1,5-pentanediol and 1,6-hexanediol, amines, such as ethylenediamine, 1,6-hexamethylenediamine or 4,4'-diaminodiphenylmethane, and amino alcohols, such as N-methylethanolamine. In principle, however, all abovementioned, at least difunctional compounds, as described for the synthesis of the soft segments, can be used as initiator molecules. Suitable polyesterpolyols and polyetherpolyols and their preparations are mentioned, for example, in EP-B 0 416 386.

A novel polyurethane has at least one anchor group L which is covalently bonded to a polyether segment having at least one nitrogen atom in the polyurethane. The preparation of suitable polyethers has been described, for example, above. In addition to these, however, those polyethers which have a nitrogen atom in each case at the end of the ether segment, in particular in the form of an amino group, are also suitable. Those polyether segments which have at least one nitrogen atom exclusively in the terminal position are also suitable here. However, polyether segments which have a nitrogen atom at at least one chain end and a further nitrogen atom or a plurality of further nitrogen atoms inside the polyether chain are likewise suitable.

In a further embodiment of the present invention, those nitrogen-carrying polyethers which carry the nitrogen atom not inside the backbone of the polyether segment but as a side chain are also suitable.

In the context of the present invention, for example, polycarbonates may also be used as soft segments (A). In a preferred embodiment of the invention, polycarbonates which are substantially linear and have at least two, preferably terminal, OH groups are used. Corresponding polycarbonatepolyols are prepared, for example, by reacting one of the abovementioned difunctional alcohols or a mixture of two or more such difunctional alcohols with phosgene. Suitable polycarbonatepolyols, for example those based on 1,6-hexanediol, and their preparations are described, for example, in U.S. Pat. No. 4,131,731.

For example, aliphatic alcohols having three or more functional groups and 3 to about 15, preferably about 3 to about 10, carbon atoms can also be used in amounts of up to about 5% by weight, based on the total mass of the soft segments contained in the thermoplastic polyurethane, in the preparation of the soft segments. Suitable compounds of this type are, for example, trimethylolpropane, triethylolpropane, glycerol, pentaerythritol, sorbitol, mannitol and further sugar alcohols having up to about 10 OH groups per molecule. The corresponding derivatives of said compounds, as can be obtained by reaction with an alkylene oxide of 2 to about 4 carbon atoms or a mixture of two or more such alkylene oxides, can also be used for the preparation of the soft segments. In a further variant, carboxylic acids or derivatives thereof having three of more functional groups may also be used. Said compounds can be used in each case alone or as mixtures of two or more of said compounds.

In a preferred embodiment of the invention, for example, polyesters which are obtainable from a reaction of adipic acid or isophthalic acid and/or a mixture thereof with 1,6-hexanediol or 1,4-cyclohexanedimethanol or a mixture thereof are used as soft segment (A).

In a preferred embodiment of the invention, the soft segments (A) have glass transition temperatures of from about −50 to about 20° C. In a further preferred embodiment of the invention, the glass transition temperatures of the soft segments (A) are from about −30 to about 0° C. In order to ensure the desired mechanical properties of the novel thermoplastic polyurethane, the soft segment (A) should have a molecular weight of from about 500 to about 25000 g/mol. In a preferred embodiment of the invention, soft segments (A) which have a molecular weight of from about 2000 to about 10000, for example from about 3000 to about 7000, g/mol are used.

Compounds which are suitable for use as soft segments (A) and belong to the abovementioned classes of compounds may be present from the outset in a molecular weight range suitable for use as soft segment (A). However, it is also possible to use, for the preparation of soft segments (A), those compounds of the abovementioned classes of compounds which have a molecular weight which is below the molecular weight suitable for the use as soft segment (A) or below the desired molecular weight. In this case, it is possible, within the scope of the present invention, to extend such compounds of the abovementioned classes of compounds by reaction with corresponding difunctional compounds until the required or desired molecular weight is reached. Depending on terminal group Y, for example, dicarboxylic acids, difunctional epoxy compounds or diisocyanates are suitable for this purpose, diisocyanates being used in a preferred embodiment of the present invention.

In principle, those difunctional or higher-functional compounds which lead to a glass transition temperature of the extended soft segment (A) which is within the desired range are used for the abovementioned molecular weight increase. In a preferred embodiment of the invention, diisocyanates, in particular, for example, those of 6 to about 30 carbon atoms, are therefore used in said case as compounds for increasing the molecular weight in the preparation of the soft segments (A). Specific examples are linear aliphatic diisocyanates, such as tetramethylene 1,4-diisocyanate, pentamethylene 1,5-diisocyanate or hexamethylene 1,6-diisocyanate, and aliphatic cyclic diisocyanates, such as cyclohexylene 1,4-diisocyanate, dicyclohexylmethane diisocyanate or isophorone diisocyanate (IPDI). Further suitable diisocyanates in the context of the present invention are aromatic diisocyanates, such as tolylene 2,4-diisocyanate (2,4-TDI), tolylene 2,6-diisocyanate (2,6-TDI), the isomer mixture of the two last-mentioned diisocyanates, m-tetramethylxylylene diisocyanate (TMXDI), p-tetramethylxylylene diisocyanate, naphthylene 1,5-diisocyanate, tetrahydronaphthylene 1,5-diisocyanate, diphenylmethane 2,2'-diisocyanate, diphenylmethane 2,4'-diisocyanate and diphenylmethane 4,4'-diisocyanate (MDI) and mixtures of two or more of said diisocyanates. In a preferred embodiment of the invention, diisocyanates which have an aromatic moiety are used.

The soft segments (A) can, if required, carry one or more anchor groups L. Soft segments (A) having anchor groups L are prepared according to the conventional rules of organic chemistry, for example as described in the further course of the text for the preparation of the hard segments (B) carrying anchor groups. In a preferred embodiment of the present invention, however, the thermoplastic polyurethanes carry more anchor groups in the hard segment than in the soft segments. In a preferred embodiment of the invention, the ratio of anchor groups in the hard segments to anchor groups in the soft segments is at least about 5:1, for example at least about 10:1. In a further preferred embodiment of the invention, the soft segments (A) contained in the thermoplastic polyurethane have no anchor groups L.

For the preparation of the hard segments (B), diisocyanates are reacted with compounds which are difunctional with respect to isocyanate groups. The choice of diisocyanates and corresponding compounds difunctional with respect to isocyanate groups is made in such a way that the corresponding hard segment has a glass transition temperature as defined at the outset, the isocyanates stated above with regard to the soft segment once again being preferred.

If required, isocyanates having a functionality of more than 2 can be used in minor amounts of up to about 5% by weight, based on the total amount of the diisocyanates used for the preparation of the hard segment (B). Isocyanates suitable for this purpose are, for example, the trimerization products of difunctional isocyanates, such as butylene 1,4-diisocyanate, pentamethylene 1,5-diisocyanate or hexamethylene 1,6-diisocyanate.

Preferably used difunctional compounds for the preparation of hard segments (B) are compounds which have at least two functional groups reactive toward isocyanates with formation of a covalent bond. Suitable functional groups are, for example, those mentioned above in the explanation of the functional groups Y. In a preferred embodiment of the invention, difunctional alcohols are used for the preparation of the hard segments (B). Examples of these are diethylene glycol, 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, 1,9-nonanediol, 1,10-decanediol and the corresponding higher homologs, as can be formed by stepwise extension of the carbon chain of said compounds, and, for example, 2,2,4-trimethyl-1,5-pentanediol, 2,2-dimethyl-1,3-propanediol, 1,4-dimethylolcyclohexane, 1,4-diethanolcyclohexane, 2-methyl-2-butyl-1,3-propanediol, 2,2-dimethyl-1,4-butanediol, 1,4-dimethylolcyclohexane, neopentylglycol hydroxypivalate, triethylene glycol, methyldiethanolamine or aromatic-aliphatic or aromatic-cycloaliphatic diols of 8 to about 30 carbon atoms, it being possible to use heterocyclic ring systems or preferably isocylic ring systems, such as naphthalene derivatives or in particular benzene derivatives, such as bisphenol A, as aromatic structures. In a preferred embodiment of the present invention, compounds which have molecular weights of less than about 200, in particular less than about 150, g/mol are used for the preparation of the hard segments (B). Particularly suitable in this context are the low molecular weight aliphatic difunctional alcohols, for example ethylene glycol, propylene glycol, butylene glycol, neopentylglycol, neodiol (2-butyl-2-ethyl-1,3-propanediol) and similar short-chain aliphatic, linear or branched compounds.

The introduction of the at least one anchor group L into the hard segment (B) can be effected in various ways. Firstly, the anchor groups L can be incorporated by covalently bonding a compound or a mixture of two or more compounds which are suitable for introducing an anchor group, by a polymer-analogous reaction, to corresponding functional groups contained in the hard segment (B). If this route for the introduction of anchor groups (L) is to be followed, it is necessary for the hard segment (B) to contain, for example, free hydroxyl groups or amino groups. With the use of corresponding compounds which are suitable for reaction with the functional groups contained in the hard segment (B) and moreover have a functional group which is suitable as anchor group (L), it is possible to obtain in this manner functionalized hard segments (B) which have one or more anchor groups (L) depending on the reaction procedure during the polymer-analogous reaction. If the hard segment (B) has, for example, a hydroxyl group or two or more hydroxyl groups, functionalization of these hydroxyl groups by polymer-analogous reaction of the hard segment (B) with a sultone, for example propane sultone, is possible. In this case, sulfo groups are introduced as anchor groups L. Also possible, for example, is the reaction of hydroxyl groups contained in the hard segment (B) with correspondingly functionalized carboxylic acids, for example halocarboxylic acids, such as chloroacetic acid, in order to achieve functionalization of the hard segment with one or more corresponding anchor groups. Carboxylic anhydrides are furthermore suitable for functionalizing functional groups contained in the hard segment (B). A corresponding polymer-analogous reaction of functional groups contained in the hard segment, for example hydroxyl groups, with carboxylic anhydrides leads to hard segments (B) which have a carboxyl group as anchor group L. For example, epoxy compounds having appropriate anchor groups are also suitable for binding corresponding anchor groups to functional groups contained in the hard segment (B). Furthermore, the anchor groups can be introduced by a Michael addition reaction with suitable groups in the polymer backbone.

Before the polymer-analogous reaction of the functional groups contained in the hard segment (B) with an appropriate compound suitable for the formation of anchor groups, functional groups contained in the hard segment (B) can be reacted, for example, with alkylene oxides of 2 to 4 carbon atoms. In a preferred embodiment of the invention, functional hydroxyl groups contained in the hard segment (B) are reacted with from about 1 to about 30 mol of alkylene oxide, in particular propylene oxide, per hydroxyl group.

A further possibility for providing the hard segments (B) with anchor groups (L) is to use a compound appropriately functionalized with an anchor group L in the synthesis of the hard segment (B) itself and thus to introduce said anchor groups into the hard segment (B) during the synthesis of the hard segment (B) itself. Appropriate compounds functionalized with an anchor group L therefore have at least two functional groups reactive toward an isocyanate group with formation of a covalent bond, for example the abovementioned functional groups Y. Suitable compounds of this type are, for example, dimethylolpropionic acid or further difunctional compounds reactive with isocyanates and having a group, such as —SO$_3$Na, interacting with inorganic surfaces, for example pigment surfaces, for example Tegomer DS3135 formerly sold by Goldschmidt.

In a further preferred embodiment, the hard segment (B) can likewise contain a polyether segment having at least one nitrogen atom to which polyether segment an anchor group L is covalently bonded. For example, the abovementioned polyether segments are suitable as a polyether segment having at least one nitrogen atom.

The number of anchor groups L per hard segment (B) may vary within wide limits, in each case the solubility in conventional solvents, e.g. THF or dioxane, being the limiting factor. If a novel thermoplastic polyurethane has only one hard segment (B) (shown in the formula I/formula Ia, where n is 1, or in the formula II, where n is 0), the number m in the formula I/formula Ia which indicates the number of anchor groups L in the hard segment (B) is from 1 to about 10. In a preferred embodiment of the invention, m is 1. If the thermoplastic polymer has more than one hard segment (B), for example as shown in the formula I/formula Ia, where n is greater than 1, it is not absolutely essential in the context of the present invention for each hard segment (B) in the thermoplastic polymer to carry an anchor group L or two or more anchor groups L. It is merely necessary for at least one hard segment in the thermoplastic polymer to carry an anchor group L. It is also intended in the context of the present invention that two or more hard segments (B) have a different number of anchor groups in a single thermoplastic polymer. A thermoplastic polyurethane which can be used in the context of the present invention can accordingly, if it has two or more hard segments (B), have in each case hard segments (B) without anchor groups L, with one anchor group L or with two or more anchor groups L, it being necessary for at least one of the hard segments (B) to carry at least one anchor group L. The notation B(L) as used, for example, in formula I/formula Ia and formula II is therefore not to be understood to mean that every hard segment (B) must carry an anchor group L. All that is critical is that at least one hard segment in the thermoplastic polyurethane carries at least one anchor group L.

The parameters m and r as used in formula I/formula Ia and II therefore need not be an integer but may assume values which include the total numerical range within the limits for r and m.

Depending on the conditions in the polymer synthesis, the parameter n also need not necessarily be an integer since, as a rule, molecules having different molecular weights form in polymer syntheses and hence n may be different for molecules formed during the polymer synthesis. In the present case, the parameter n therefore expresses the average number of repeating units in the totality of the polymer molecules considered.

In a preferred embodiment of the invention, a hard segment (B) contains the anchor groups L defined above.

In a preferred embodiment of the invention, the hard segments (B) have glass transition temperatures higher than the temperature of use of a magnetic storage medium produced from the novel polyurethanes, for example from about 20 to about 90° C. In a further preferred embodiment of the invention, the glass transition temperatures of the hard segments (B) are from about 20 to about 80° C., for example from about 40 to about 70° C. In order to ensure the desired mechanical properties of the novel thermoplastic polyurethane, the hard segments (B) should have a molecular weight of from about 350 to about 30000 g/mol. In a preferred embodiment of the invention, hard segments (B) which have a molecular weight of from about 1000 to 20000, for example from about 2000 to about 15000, g/mol or from about 3000 to about 12000 g/mol are used.

The preparation of the soft segments (A) and of the hard segments (B) is carried out according to the conventional rules of organic polymer chemistry. If a polyester, a polyether, a polycarbonate, a polyacetal or another compound which can be used as a soft segment is employed as the soft segment, the preparation thereof is carried out according to conventional methods of polymer chemistry which are known to a person skilled in the art. If it is intended to link to one another different compounds from among said compounds which can be used as a soft segment, because molecular weight of the individual compounds is too low, this is effected, depending on the difunctional compound used for the chain extension, likewise according to the conventional rules known in organic chemistry for the respective functional groups.

The preparation of the soft segments (A) is carried out so as to give a soft segment (A) which has at least two functional groups Y, one group Y being capable of reacting with an isocyanate group with formation of a covalent bond. Suitable groups Y have been mentioned above in the course of this text. In a preferred embodiment of the invention, soft segments (A) which carry OH groups as functional groups Y are used for the preparation of the thermoplastic polyurethanes. The number of functional groups Y per soft segment should be at least about two. However, it is also possible to use soft segments whose functionality is higher than two, for example about 3. It is furthermore possible to use mixtures of two or more different soft segments (A) which differ, for example, in their functionality with respect to isocyanate groups. Thus, it is entirely possible in the context of the present invention for the soft segments (A) used to have a functionality with respect to isocyanate groups which is, for example, from 2 to 3, e.g. from about 2.1 to about 2.5.

In a preferred embodiment of the invention, the soft segments (A) used are polyesterpolyols, polyetherpolyols or polycarbonatepolyols which, if required, were extended with diisocyanates, for example diphenylmethane diisocyanate or tolylene diisocyanate, until an appropriate molecular weight was reached.

The compounds used within the scope of the present invention as hard segments (B) are prepared, in a preferred embodiment, in such a way that polyurethane prepolymers which can be used as hard segments and have at least two isocyanate groups are present after the preparation. In a preferred embodiment of the invention, the compounds which can be used as hard segments have at least two isocyanate groups as terminal isocyanate groups.

The novel thermoplastic polyurethanes are prepared by reacting the compounds which can be used as soft segments (A) with the compounds which can be used as hard segments (B). In the context of the present invention, compounds which may be used as soft segments (A) have a structure Y-A-Y, where Y has the aforementioned meanings and A is one of the structures which are described above and can be used as soft segment (A). Compounds which can be used in the context of the present invention as hard segments (B) accordingly have a structure OCN—B(L)$_m$-NCO and are accordingly reactive toward the structures forming the soft segments, with formation of a covalent bond. Such structures only schematically show the composition of the compounds to be reacted with one another. In accordance with the above statements, the number of functional groups can differ from the form shown structurally. As explained above, it is not necessary for all compounds used for the formation of hard segments (B) to have one or more anchor groups. It is only necessary to add compounds carrying a sufficient number of anchor groups L so that each thermoplastic polyurethane has at least one hard segment which carries at least one anchor group L; a structure A-B(L)-A is preferred here.

The present invention therefore also relates to a process for the preparation of a novel thermoplastic polyurethane, in which at least one at least difunctional linear or branched polyurethane prepolymer having terminal NCO groups, for example a compound OCN—B(L)$_m$-NCO, as hard segment (B) is reacted with at least one linear or branched soft segment (A) having at least one functional group reactive toward NCO groups, for example a compound Y-A-Y.

The reaction of the compounds Y-A-Y and OCN—B(L)$_m$-NCO can be carried out in a manner known per se, preferably at from about 0 to about 120° C. The ratio of the two components is advantageously chosen so that the ratio of Y to NCO groups is from about 2 to about 1. Following the conventional rules of polymer chemistry, the molecular weight of the thermoplastic polyurethanes obtained can be controlled within wide limits by corresponding variations of said ratio.

At least one of the thermoplastic polyurethanes present in the novel binder has a molecular weight of from about 3000 to about 150000, for example from about 8000 to about 100000 or from about 10000 to about 60000.

If required, further, low molecular weight compounds may be present during the reaction. Such compounds can act, for example, as chain extenders. For example, primary amino compounds of two to about 20, for example 2 to about 12, carbon atoms are suitable for this purpose. These are, for example, ethylamine, n-propylamine, isopropylamine, sec-propylamine, tert-butylamine, 1-aminoisobutane, substituted amines of 1 to about 20 carbon atoms, such as 2-(N,N-dimethylamino)-1-aminoethane, aminomercaptans, such as 1-amino-2-mercaptoethane, aliphatic amino alcohols of 1 to about 20, preferably 1 to about 12, carbon atoms, for example methanolamine, 1-amino-3,3-dimethylpentan-5-ol, 2-aminohexane-2',2"-diethanolamine, 1-amino-2,5-dimethyl-cyclohexan-4-ol, 2-aminopropanol, 2-amino-1-butanol, 3-amino-1-propanol, 1-amino-2-propanol, 2-amino-2-methyl-1-propanol, 5-amino-1-pentanol, 3-aminomethyl-3,5,5-trimethylcyclohexan-1-ol, 1-amino-1-cyclopentanemethanol, 2-amino-2-ethyl-1,3-propanediol, aromatic-aliphatic or aromatic-cycloaliphatic amino alcohols of 6 to about 20 carbon atoms, suitable aromatic structures being heterocyclic ring systems or preferably isocyclic ring systems, such as naphthalene derivatives or in particular benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol, and mixtures of two or more such compounds.

The reaction can be carried out in the presence or absence of a catalyst. In a preferred embodiment, it is, for example, a tertiary amine, such as triethylamine, tributylamine, diazabicyclo[2.2.2]octane, N-methylpyridine, or N-methylmorpholine. Further suitable catalysts are organometallic compounds, such as dibutyltin dilaurate, and metal salts, such as tin octanoate, lead octanoate or zinc stearate. The amount of catalyst present during the reactions is in general from about 1 to about 500 ppm by weight.

The presence of a solvent or diluent is as a rule not necessary. In a preferred embodiment, however, a solvent or a mixture of two or more solvents is used. Suitable solvents are, for example, hydrocarbons, in particular toluene, xylene or cyclohexane, esters, in particular ethylglycol acetate, ethyl acetate or butyl acetate, amides, in particular dimethylformamide or N-methylpyrrolidone, sulfoxides, in particular dimethyl sulfoxide, ethers. in particular diisopropyl ether or methyl tert-butyl ether, or preferably cyclic ethers, in particular tetrahydrofuran or dioxane.

If, in the preparation of the novel thermoplastic polyurethane, the compound Y-A-Y is used in excess, for example in twice the molar amount, for the corresponding compound forming the hard segment, a thermoplastic polyurethane which carries functional groups Y as terminal groups forms. For the preparation of thermoplastic polyurethanes according to the formula II, these compounds containing terminal groups reactive toward isocyanate groups can be reacted with compounds difunctional with respect to such groups, with chain extension. Corresponding difunctional compounds of the formula X-Z-X have, as functional groups X, groups reactive toward functional groups Y. Examples of such functional groups X are primarily the isocyanate groups which are used in a preferred embodiment of the present invention. Depending on the type of functional group Y, however, X may also be other functional groups reactive toward Y, for example epoxy groups, carboxyl groups, carboxylic ester groups, carboxylic anhydrides or double bonds, which can be subjected to a Michael addition reaction with Y.

In a preferred embodiment of the invention, Z has, as functional groups X, at least two epoxy, OH, NCO or COOH groups or a mixture of two or more thereof which are not reactive to one another.

The present invention also relates to a binder, at least comprising a novel thermoplastic polyurethane.

The novel binder contains at least one thermoplastic polyurethane which has at least one hard segment (B), at least one of the hard segments (B) carrying at least one anchor group L. In a preferred embodiment of the present invention, the novel binder contains such a thermoplastic polyurethane or a mixture of two or more such thermoplastic polyurethanes in an amount of at least about 10, for example at least about 30 or 50, % by weight. In the preferred embodiment of the invention, the content of binder is about 50±5% by weight, based on the novel polyurethane, it being possible for the remainder to comprise conventional polymers suitable for use in binders, for example polyurethanes. In addition to said thermoplastic polyurethanes which carry an anchor group L in at least one hard segment (B), the novel binder can also contain a further thermoplastic polyurethane or a mixture of two or more further thermoplastic polyurethanes.

In a further preferred embodiment of the present invention, the novel binders contain at least one further binder in addition to the abovementioned thermoplastic polyurethane or the abovementioned thermoplastic polyurethanes.

The novel binders may contain a further polymer or a mixture of two or more further polymers in addition to said thermoplastic polyurethanes according to formula I/formula Ia or formula II or mixtures thereof. The further polymers which can be used in the novel binder are, for example, nonthermoplastic polyurethanes, polyacrylates, polyesterpolyurethanes, poly(meth)acrylateurethanes, polymethacrylates, polyacrylamides, polymers or copolymers of vinyl monomers, such as styrene, vinyl chloride, vinyl acetate, vinyl propionate, binders based on vinylformals, cellulose-containing polymers, such as cellulose esters, in particular cellulose nitrates, cellulose acetates, cellulose acetopropionate or cellulose acetobutyrate, phenoxy resins or epoxy resins, as can be obtained in a manner known per se, or mixtures of two or more thereof.

The novel binders contain the thermoplastic polyurethanes as a rule in an amount of up to about 100% by weight. Further binders may be present in an amount of up to about 90, for example up to about 70, 60, 50, 40 or 30, % by weight or less in the novel binder.

The novel polyurethanes can be used both as dispersing binders and as coating binders. If a novel polyurethane is to be used as a dispersing binder, the number of anchor groups per hard segment in the polymer should be at least about 1, in particular from about 1 to about 3. If a novel polyurethane is to be used as a coating binder, the number of anchor groups per hard segment in the polymer should be from about 0.1 to about 0.9, in particular from about 0.2 to about 0.6. The same applies if mixtures of two or more polymers are used for the preparation of the dispersing binders or coating binders. In this case, the ratio of hard segments with anchor groups to hard segments without anchor groups should be established so that the abovementioned values are complied with.

In a preferred embodiment of the invention, novel polymers suitable for use as dispersing binders have a glass transition temperature ($T_g$) of from about 55 to about 65° C. and a molecular weight of from about 10000 to about 25000. In a preferred embodiment of the invention, novel polymers suitable for use as coating binders have a glass transition temperature ($T_g$) of from about 12 to about 30° C. and a molecular weight of from about 40000 to about 80000.

In a preferred embodiment of the invention, the novel binders contain a magnetic pigment or a mixture of two or more magnetic pigments and are suitable as a magnetic dispersion or as a component thereof. Suitable magnetic pigments are the conventional oxidic pigments, such as $\gamma$-$Fe_2O_3$, $Fe_1O_4$, $FeO_x$ (1.33<x<1.5), $CrO_2$, Co-modified $\gamma$-$Fe_2)_3$. Co-modified $Fe_3O_4$, Co-modified $FeO_x$ (1.33<x<1.5), ferromagnetic metal pigments or metal alloy pigments, barium ferrite or strontium ferrite. The metal pigment or metal alloy pigment comprises a metal, e.g. Fe, Co or Ni, or a combination of two or more of these metals as the main component and, if required, further metal components, such as Al, Si, S, Sc, Ti, V, Cr, Cu, Y, Mo, Rh, Pd, Ag, Sn, Sb, Te, Ba, Ta, W, Re, Au, Hg, Pb, Fe, Bi, La, Ce, Pr, Nd, P, Co, Mn, Zn, Ni, Sr or B. As is generally customary, further elements or compounds may be mixed with these pigments.

The novel binder may also contain fillers, dispersants, further additives, such as lubricants, carbon black or non-magnetic inorganic or organic pigments.

For the preparation of the novel magnetic dispersions, a thermoplastic polyurethane or a mixture of two or more of the abovementioned thermoplastic polyurethanes with magnetic pigment or a mixture of two or more magnetic pigments, for example as a mixture with one or more solvents and, if required, together with fillers, dispersants, further binders and further additives, such as lubricants, carbon black or nonmagnetic inorganic or organic pigments can therefore be dispersed together. In a preferred embodiment, the main components in the magnetic dispersion, in particular the pigments and the binder, are first combined with addition of a little solvent to give a pasty mass and then thoroughly mixed with one another, for example by kneading, and are dispersed only thereafter.

For example, carboxylic acids of about 10 to about 20 carbon atoms, in particular stearic acid or palmitic acid, or derivatives of carboxylic acids, such as their salts, esters or amides, or mixtures of two or more thereof, may be used as lubricants.

Suitable nonmagnetic inorganic additives are, for example, alumina, silica, titanium dioxide or zirconium dioxide, and suitable nonmagnetic organic pigments are, for example, polyethylene or polypropylene.

When they are used in magnetic recording media, the novel binders can, for example, be applied to conventional rigid or flexible substrate materials. Suitable substrate materials are, for example, films of linear polyesters, such as polyethylene terephthalate or polyethylene naphthalate, which generally have thicknesses of from about 4 to about 200, in particular from about 5 to about 36, micrometers.

The present invention therefore also relates to a molding, in particular a self-supporting molding, for example in film form, or as a composite of a plurality of layers or film-forming bodies, at least comprising a novel binder or a binder prepared by a novel process.

The present invention also relates to the use of a novel binder or of a binder prepared according to the invention for the production of magnetic recording media. In particular, the following may be mentioned as recording media: video cassettes, both for the professional and for the end user sector; audio cassettes, both for the professional and for the end user sector, e.g. digital audio tape; data storage tapes; diskettes; floppy disks; zip disks; magnetic stripes.

The examples which follow illustrate the invention.

EXAMPLES

Example 1

A polyurethane block comprising 1 mol of α,ω-polypropyleneglycoldiaminosulfopropyl sodium salt, 8 mol of 1,3-bis(1-methyl-1-isocyanatoethyl)benzene (TMXDI, m-tetramethylxylylene diisocyanate), 6 mol of neopentylglycol and 2 mol of ethanolamine is reacted with 11.1 mol of a polyesterdiol having a molar mass of 802, comprising adipic acid, isophthalic acid and 1,4-cyclohexanedimethanol, and with 11.1 mol of diphenylmethane 4,4'-diisocyanate in tetrahydrofuran as a solvent with addition of dibutyltin dilaurate as a catalyst at 60° C. until an NCO content of 0% is reached.

Preparation of the Polyurethane Block:

1952 g of 1,3-bis(1-methyl-1-isocyanatoethyl)benzene are dissolved in 7360 g of tetrahydrofuran.

1439 g of a 40% strength solution of anhydrous α,ω-polypropyleneglycoldiaminosulfopropyl sodium salt in tetrahydrofuran are rapidly added while stirring.

After 10 minutes, the stirring is stopped and, after it has settled out, the white precipitate is filtered off.

624 g of neopentylglycol and 1.7 g of dibutyltin dilaurate are added to the filtrate.

122.2 g of ethanolamine are added at an NCO content of 0.74%.

Example 2

A polyurethane block comprising 1 mol of α,ω-polypropyleneglycoldiaminosulfopropyl sodium salt, 8 mol of 1,3-bis (1-methyl-1-isocyanatoethyl)benzene, 6 mol of neopentylglycol and 2 mol of ethanolamine is reacted with 11.1 mol of a polyesterdiol having a molar mass of 802, comprising adipic acid, isophthalic acid and 1,4-cyclohexanedimethanol, and with 11.655 mol of diphenylmethane 4,4'-diisocyanate in tetrahydrofuran as a solvent with addition of dibutyltin dilaurate as a catalyst at 60° C. until a defined viscosity (1000 mPa.s (based on 40% strength solution)) is reached. The polyurethane block is prepared analogously to example 1.

Preparation of the Binder:

8903.2 g of polyester having a molar mass of 802, comprising adipic acid, isophthalic acid and 1,4-cyclohexanedimethanol, 2914.6 g of diphenylmethane 4,4'-diisocyanate and 14294.1 g of tetrahydrofuran are added to the polyurethane block described above and the batch is stirred at 60° C. until the viscosity is 1000 mPa.s. The isocyanates still present at this time is destroyed by adding an equivalent amount of dibutylamine, and the further reaction is thus stopped.

Example 3

2.07 kg of ceramic balls having a diameter of from 1.0 to 1.25 mm are introduced into a stirred ball mill, and furthermore 4553 g of a solvent mixture comprising tetrahydrofuran and methyl isobutyl ketone, consisting of 85 parts of tetrahydrofuran and 15 parts of methyl isobutyl ketone, 650 g of a solution of the novel polymer, 25% strength in tetrahydrofuran, 650 g of a commercial polyurethane, 25% strength in THF, 1400 g of a ferromagnetic iron powder having a coercive force of 130 kA/m. 14 g of a conductive carbon black, 127.4 g of a spherical alumina and 25.4 g of a mixture of fatty acids and fatty acid esters were added. The batch was dispersed for 5 hours until the gloss was constant at 125. After filtration through a filter having a pore size of 2 μm, a homogeneous, finely divided dispersion stable to settling out was obtained. Immediately before coating, 0.012 part, based on 1 part of the dispersion, of a solution of a triisocyanate obtained from 3 mol of tolylene diisocyanate and 1 mol of trimethylolpropane, 50% strength in tetrahydrofuran, was added to the dispersion with vigorous stirring.

The dispersion was applied with a dry coat thickness of 3 μm to a polyethylene terephthalate film having a backing coating. Before drying, the coated web was passed through an orientation zone consisting of a coil having a field strength of 200 kA/m in order to orient the ferromagnetic pigment. After passing through the magnetic field, the coated film web was dried at 80° C. and calendered by being passed between heated steel rolls at a roll temperature of 60° C. under pressure (nip pressure 200 kg/cm).

Comparative Example

The procedure was as described above, but the novel polymer was replaced by a commercial binder having sulfonate anchor groups.

The dispersions prepared according to the example are storage-stable and readily processible and the tapes produced therewith meet the set requirements in every respect.

The dispersions prepared according to the comparative example are storage-stable only to a limited extent. Owing to the poorer surface, the tapes have a lower video output level and exhibit deposits on the video head in a reproducible manner.

TABLE 1

|  | Example | Comparative example |
|---|---|---|
| Duration of dispersing (hours) | 5 | 8 |
| Gloss 1 | 125 | 113 |
| Gloss 2 | 125 | 101 |
| RF level (dB) | 1.3 | 0.2 |
| S/N (dB) | 0.6 | −0.4 |
| Abrasion on the video head (rating) | 1.5 | 3.5 |

The measured values (table 1) have the following meanings:

Gloss Measurement:
The reflection at an angle of 60° to the uncalendered layer is measured.
Gloss 1: Gloss immediately after the end of dispersing
Gloss 2: Gloss after 24 hours on the roller stand
The higher the gloss, the better the pigment dispersion. The reduction in the gloss on gentle movement of the dispersion (roller stand) indicates reagglomeration and hence storage instability of the dispersion.

RF Level:
The radio frequency level was measured in a Betacam SP recorder (BVW 75 system, from Sony) against the reference tape RSB 01 SP. The higher the RF level, the better the tape.

S/N (Luminance):
The luminance signal was measured in a Betacam SP recorder (BVW 75 system, from Sony) against the reference tape Sony RSB 01 SP. The higher the S/N value, the better the tape.

Abrasion on the Video Head:
The abrasion was assessed visually on the basis of a rating scale from 1 to 6 (very good to very poor).

We claim:

1. A polyurethane, which has a block structure or thermoplastic properties or both, and at least one soft segment (A) and at least one hard segment (B), wherein said at least one hard segment (B) has at least one anionic anchor group L covalently bonded to a polyether segment having at least one nitrogen atom in the polyurethane, said polyurethane having a structure according to the formula I $$Y\text{-}(A\text{-}B(L)_m\text{-}A\text{-})_nY \qquad (I)$$

or the formula $$Y\text{-}(A\text{-}B(L)\text{-}_m)_nY \qquad (Ia)$$

or the formula II $$Y\text{-}(A\text{-}B(L)_r\text{-}A\text{-}Z\text{-})_n\text{-}(A\text{-}B(L)_m\text{-}A\text{-}Y \qquad (II)$$

where A, B, and L have the abovementioned meanings, Z is a radical or a compound X-Z-X which is at least difunctional with respect to Y with formation of a covalent bond, Y is a functional group reactive toward the functional groups X of the compound Z with formation of a covalent bond, X is at least one functional group which is reactive toward the functional groups Y with formation of a covalent bond, n is from 1 to 10, m is from 1 to 10 and r is from 0 to 10, the number of anchor groups L in the total polyurethane being from 1 to n–m (formulae I and Ia) or from 1 to n–r+m (formula II).

2. The polyurethane as claimed in claim 1, wherein Y is OH, NH$_2$, NHR, SH or COOH, where R is a linear or branched, saturated or unsaturated alkyl radical of 1 to 24 carbon atoms or an aryl radical of 6 to 24 carbon atoms.

3. The polyurethane as claimed in claim 1, wherein the anchor group L is covalently bonded to at least one nitrogen atom in the polyether segment.

4. A binder, at least comprising a thermoplastic polyurethane.

5. A magnetic dispersion, at least comprising a polyurethane as claimed in claim 1 or a binder comprising a thermoplastic polyurethane as claimed in claim 1 and at least one magnetic or magnetizable pigment.

6. A process for the preparation of a polyurethane as claimed in claim 1, wherein at least one linear or branched polyetheramine which is at least difunctional with respect to NCO groups and carries at least one covalently bonded anionic group L is used in the preparation.

7. A magnetic recording medium, at least comprising a polyurethane as claimed in claim 1 or a binder comprising a thermoplastic polyurethane as claimed in claim 1 or a magnetic dispersion at least comprising a polyurethane as claimed in claim 1 and at least one magnetic or magnetizable pigment or a polyurethane prepared as claimed in claim 1, wherein at least one linear or branched polyetheramine which is at least difunctional with respect to NCO groups and carries at least one covalently bonded anionic group L is used I the preparation.

8. The magnetic recording medium as claimed in claim 7, which is in the form of an at least two-layer composite film.

9. A process for the preparation of a novel thermoplastic polyurethane as claimed in claim 6, in which at least one at least difunctional linear or branched polyurethane prepolymer having terminal NCO groups as hard segment (B) is reacted with at least one linear or branched soft segment (A) having at least one functional group reactive toward NCO groups.

10. A magnetic recording medium comprising a substrate having coated thereon a magnetic dispersion comprising at least one magnetic pigment and a binder according to claim 4.

11. A magnetic recording medium according to claim 10 wherein said dispersion further comprises at least one lubricant.

12. A magnetic recording medium comprising a magnetic dispersion according to claim 5.

13. A magnetic recording medium according to claim 10 wherein said magnetic pigment is a ferromagnetic pigment.

14. A magnetic recording medium according to claim 10 wherein said medium is selected from the group consisting of tapes, floppy disks and diskettes.

* * * * *